INVENTORS,
HELGE SHIPSTEAD
PETER SOLBERG

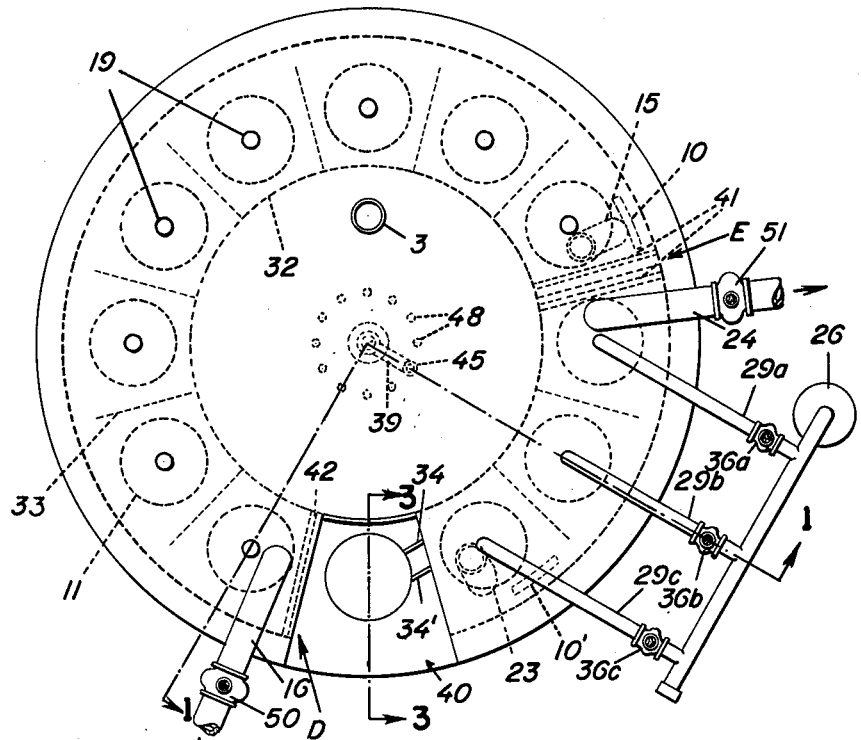
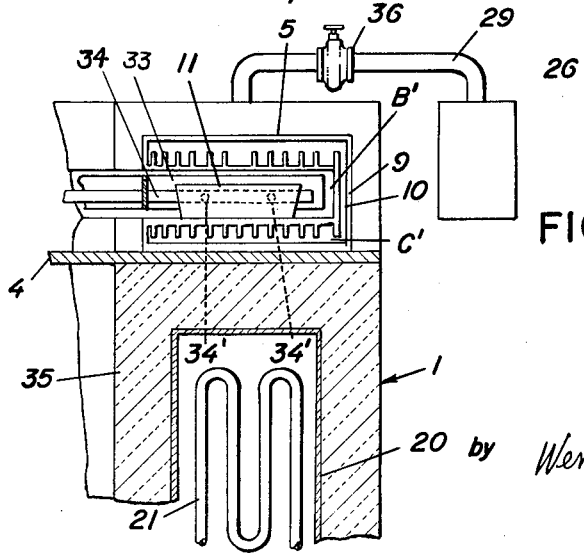

3,084,537
METHOD AND APPARATUS FOR DETERMINING TOTAL SOLIDS IN ORGANIC LIQUID MATERIALS
Helge Shipstead, 545 Oak Ave., Davis, Calif., and Peter Solberg, Vollebekk, Norway
Filed Apr. 29, 1959, Ser. No. 809,729
Claims priority, application Norway Apr. 30, 1958
10 Claims. (Cl. 73—61)

This invention relates to a method and an apparatus for determination of the total solids in organic materials, especially foods.

The invention aims particularly at determining the solids in milk and milk products, and the invention will here, for the sake of simplicity, be described in connection with the determination of the total solids in milk, but it should be clear that it can also with advantage be used for the determination of the solids in other organic substances, where the need exists for accurate and, at the same time, rapid determination of the solids in a large number of products which have to be investigated.

The usual procedure for determination of the total solids in milk is that 2 to 3 ml. of milk are evaporated in dishes on a water vapor bath, after which the milk substance is dried in a drying cabinet at about 100° C. for three hours. After the drying the dishes have to be cooled in a desiccator before again being weighed. The drying cabinet is ventilated, but the temperature and ventilation vary from place to place in the cabinet. This causes variations in the results. Further, the dishes have to be washed and dried before being used again. This procedure can be performed more quickly by using light aluminum dishes or milk bottle capsules, which can be thrown away after use.

Many different variations of this method have been worked out, for example by employment of a vacuum, but all the known procedures are encumbered by several drawbacks. Thus the determinations usually require a relatively long time, and the results obtained are not always reliable. In these procedures the solids are subjected to such a strong and, at the same time, prolonged heating that they suffer modification, for example they become partly caramellized, with the result that they become more or less brown in color, and the results consequently become inexact.

Accordingly there exists a great need for a speedy and accurate procedure which makes it possible in a simple labor saving way to carry out a large number of determinations in the course of a relatively short time, and which at the same time does not, for its execution, require any particularly skilled knowledge.

The inventors have taken up this problem for exhaustive examination and have arrived at a solution which is satisfactory.

One of the great difficulties in effecting determinations of the total solids in organic materials, such as milk is the need for quite a strong heating for rapid evaporation of the water content of the sample, and especially for evaporation of the last residues of the water in the sample, without the occurrence of decomposition or excessive burning of the sample.

In the method according to the invention ordinary air is used as heating agent, which is conducted over the samples to be dried. It is of course known per se to use air as heating agent. It is, however, a characteristic feature of the method according to the invention, that the hot air is conducted toward the samples in the dishes through pipes which are centrally located over these, with the result that the drying air flows from the central area of the dish and outwards towards the sides of the dish, and then away. The drying air will by this arrangement sweep over the whole surface of the sample, which lies in a thin, uniform, weighed layer in the dish, and flow right up along the walls of the dish, so that the whole surface of the sample is unfailingly exposed to a uniform current of drying air. Air is supplied at a suitable rate such that the milk will not be splashed from the dish or unduly agitated, but evaporation will be rapid. Thereby a uniform and rapid drying of the whole, weighed, sample is obtained.

In the method according to the invention, use is made, further, of a number of sectional drying chambers. The samples are moved from section to section with the temperature of the drying air preferably increasing from zone to zone, with the result that in the last drying section the almost completely dried sample is subjected to the action of the hottest and, if necessary, previously dried, current of air, after which the completely dried sample is moved into a cooling unit, where it is subjected to previously dried cold air, in order to cool the samples to room temperature before the final weighing is effected.

The method according to the invention is carried out, in conformity with the above, in such a way that dishes of a suitable kind, preferably aluminum dishes, are weighed and then charged with a small quantity of the product, about 1 gram, to be investigated and again weighed. The dishes are then manipulated in such a manner that the sample is spread evenly in a thin layer over the whole bottom surface of the dish, and they are then placed in a closed drying apparatus divided into a number of sectional chambers, where the dishes with the samples are moved mechanically or manually and periodically from the first sectional chamber to the last, and in each of these sections removal of water from the sample is effected by the method that a hot current of air is conducted through valves fitted overhead centrally down toward the central area of the dish, in such a manner that the drying air flows from the central area outwards towards the sides of the dish and then upwards across the outer edge and further the hot air increases in temperature from the first to the last section. The dishes are periodically moved from one drying section to the next, so that in the last section the sample is exposed to the hottest air current and hottest heating plate, after which the dishes with the now completely dry samples are moved through a cooling section, separated and insulated from the drying sections, where the dishes with the dry solids are cooled to room temperature by means of a cold and previously dried current of air, and then finally the dishes with solids are moved out of the cooling section to an open section and weighed.

The procedure indicated above can, of course, be performed with different kinds of apparatus, thus the different drying and cooling sections can be arranged in a longitudinal apparatus, in which the samples are carried from the one end of the drying unit in a straight line to the other end, but preferably the drying sections and cooling sections are located on the outer periphery of a circular plate.

It is, further, an essential feature of a preferred embodiment of the invention that also the housing and the disc on which the dishes rest are heated or cooled, respectively, preferably according to a system analogous with the direct, thermal action of the air, so that the dishes with contents are heated and cooled also by direct contact with the base, and consequently by radiation from the surrounding housing. This is effected, according to the invention, by the method that the roof of the housing, as well as the bottom or floor, is fitted with ducts or canals, through which air flows. The air flows through the housing in such a way that the hot air in the drying section is conveyed into the last drying section and then flows towards the service opening of the apparatus, and further, in such a way that the cold air is conveyed in at the last cooling section and through the cooling section in the direction of the first cooling section, which will thus be situated after the last and hottest drying section.

To facilitate understanding of the invention it will now be described in connection with a particularly convenient form of an apparatus for carrying out the method.

In the drawing:

FIG. 2 is a top plan view of the apparatus of FIG. 1; and

FIG. 3 is a sectional elevation view taken on line 3—3 of FIG. 2.

Figure 1:
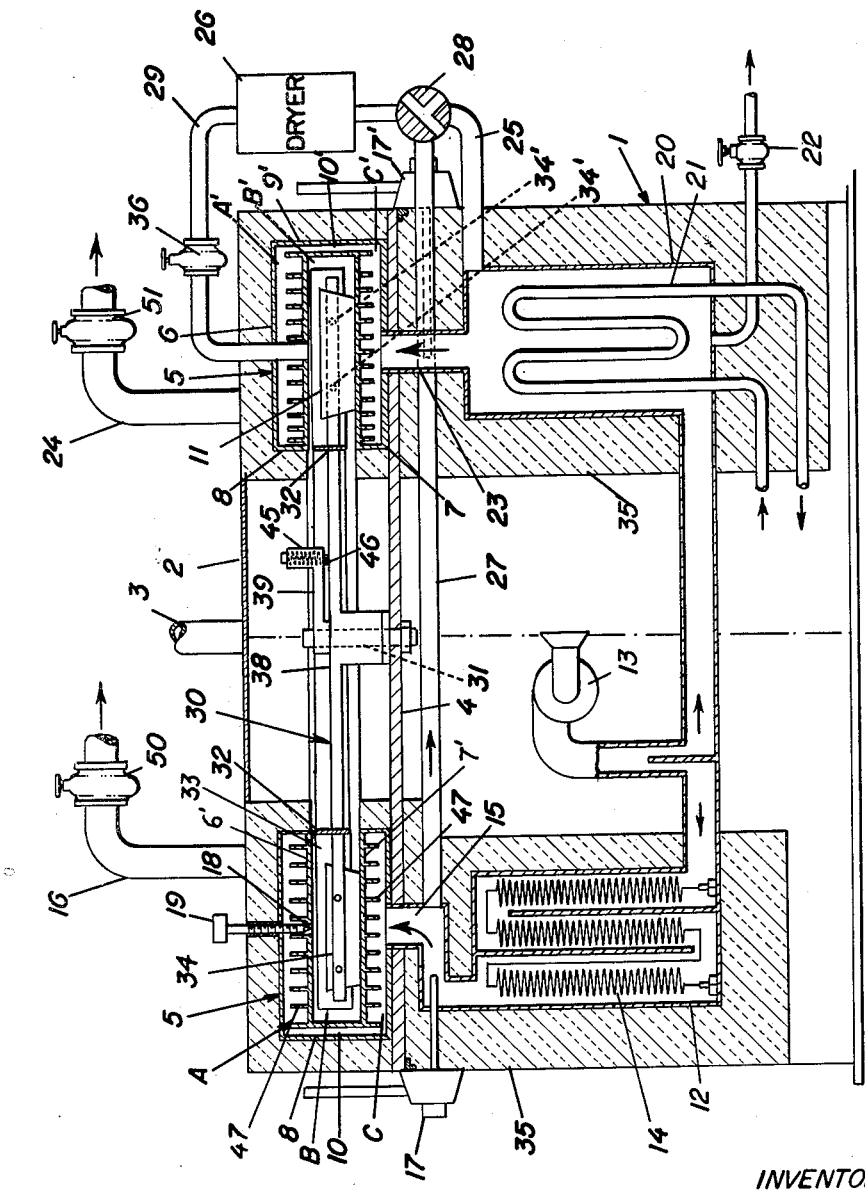
FIG. 1 is a sectional elevation view of a preferred embodiment of the apparatus taken along line 1—1 of FIG. 2.

In FIG. 1, 1 is a cylindrical container which contains the apparatus according to the invention. The housing is provided with a roof 2, fitted with an outlet 3, and on the inside is fitted with a stiffening framework, which is, however, not shown, except for the base plate 4. On the base plate there is placed an annular housing provided with a roof 6 and bottom 7, as well as inner and outer walls 8 and 9. The housing can be divided into three sections by walls 6' and 7' an upper section A, a middle section B, and a lower section C in the hot air section, and an upper section A', middle section B' and lower section C' in the cooling section. The sections A and C form air passages and are connected by ducts or canals 10 and 10', which will later be described in detail. In the middle section B the dishes 11 with samples are placed and carried.

A hot air heater 12 of a known type is provided, and may consist of a fan 13, which blows air through wire-shaped electrical heating elements 14. The hot air flows from the heater into the section C through the bottom opening 15, and flows on through the canal 10 up into section A, and thence to the open air through the outlet 16, as well as down into section B through valve openings 18, which can be adjusted by means of threaded valve members 19 threaded into wall 6 to deliver a suitable amount of air. A thermostat 17 is provided which automatically controls and regulates the temperature of the air current. A cold air cooler 20 is provided, to which, if desired, air can be supplied from the fan 13. The air current can be cooled by means of heat exchange pipes, through which passes a current of cold water. 22 is an emptying tap for condensate. From the cold-air cooler the cold air flows up into section C', through the canal 23. It should be noted here that the placing and orientation of the various ducts and passages will be described fully in connection with FIG. 2. From section C' the cold air flows up through ducts 10' to section A', and thence through outlet 24 to the open air or for possible recirculation.

Part of the cold air is carried out through a pipe 25 to a dryer 26, for example containing calcium chloride or silica gel, and thence through section A', in such a manner that the pipe opens into section B' just above one of the dishes 11 with a sample therein.

A pipe 27 passes from the hot-air heater to a three-way valve 28 in the pipe 25, which makes it possible for hot air to be conveyed through the air-dryer 26 for regeneration of the drying agent.

A disc-shaped rotor 30 is centrally journalled in relation to the annular housing 5 on a shaft journal 31. The rotor is fitted with a cylindrical ring 32, which, generally speaking, covers the openings in the inside walls of the housing 5, there being only sufficient clearance, and is, besides, fitted with 12 radial dividing walls 33, there being only a small clearance between them and walls 6 and 7, each of which walls 33 is fitted with two supporting rods 34 having pins 34' thereon resting against the dishes 11. Insulation 35 surrounds the housing 5 and the hot-air heater and cold air cooler.

FIG. 2 is a diagrammatic top view of the apparatus, showing the arrangement and orientation of the various ducts, pipes and parts.

As will be seen, the apparatus is constructed to take twelve dishes 11 with samples. The apparatus is served at 40, section A and the outer wall being here cut out to a width approximately equal to one-twelfth of the circumference of the housing. Consequently the dishes 11 can be placed directly on the roof or top of section C.

The section from D to E, in a clockwise direction, consists of the hot-air or drying portion, while the remainder from E back to D consists of the cold-air or cooling portion.

At stations D and E the sections A and C of the ring-shaped housing 5 are made with radial, vertical walls 41 and 42, respectively, which prevent a flow of air from the hot-air portion to the cold-air portion, and vice versa.

The hot-air inlet 15, with the canal 10, is located at the end of the hot-air portion, while the outlet 16 is located near the service station 40. At the outlet there is also placed a passage 10, in such a manner that hot air can flow from section C up into section A and out.

As already mentioned, the portion from E to D in a clockwise direction forms the cold-air or cooling portion. Cold air flows in through the pipe or duct 23 into section C' directly below the apparatus' service station 40. The cold air flows up into section B' through the duct 10', and all the introduced cold air leaves the apparatus through the outlet duct or pipe 24.

That portion of the cold air which is passed out through the pipe 25 and through the dryer 26 is carried on downwards through the branch pipes 29a, 29b and 29c straight through the ring-shaped housing 5, in such manner that these pipes open into the middle section B', where the dishes 11 are placed. The cold air coming through these branch pipes is controlled by means of the valves 36a, 36b and 36c so that a suitable amount of air is delivered.

The rotor 30, which is the only moveable part of the apparatus, can be rotated by hand or mechanically by attachment to a suitable motor, which is not shown. In the apparatus illustrated the rotor is moved periodically every two minutes in a clockwise direction.

A handle 39 can be installed on the shaft journal 31. The casing 45 is fitted with a spring, which presses a ball 46, or the like, down against the rotor's central disc-shaped part 38. Along the circular path which the ball 46 describes on the rotor, when this is rotated, there are provided 12 depressions 48, such that the rotor has 12 distinct stop positons, the ball 46 being pressed down into the depressions. These are placed so that the dishes stop exactly in the middle of each section.

When the apparatus is to be used, the fan 13 is set going; likewise the heating unit 12 and the cooler 20.

The hot air flows up through the duct 15 to section C and onwards to section A through the aperture 10. The air current will go in a counter-clockwise direction and heat up the whole of the ring-shaped housing 5. To increase the transfer of heat to the housing 5, the walls facing the middle section B are preferably fitted with fins 47. Some of the hot air current flows down into the middle section B through eight holes 18, which are so arranged that the air current strikes the central part of the dish containing the samples, the rotor standing in one of the twelve positions previously determined by the handle 39.

The hot air which flows down into section B will pass from this over and under the edge of the peripheral annular wall 32 and out through the roof 2 of the apparatus, through aperture 3.

The air current down into section B is regulated by means of eight threaded valve members valve screws 19.

The cold air current flows into the lower ring-section C' through the pipe 23 directly beneath the service opening 40 and thence flows in a counter-clockwise direction through section C', and also up through apertures 10' and through section A', in order finally to leave the apparatus through the pipe 24.

That portion of the cold air which is dried in the dryer 26 is conducted directly down into the middle section B' through pipes 29a, 29b and 29c, with the result that the dry, cold air current strikes the dishes in a similar way to the hot air current, through the apertures 18.

Both the hot-air outlet 16 and the cold-air outlet 24 are fitted with adjustable valves, 50 and 51 respectively. These taps are necessary, as they ensure a suitable working pressure in the ducts, and also insure that air from the outside does not enter the apparatus.

As will appear from the above description, the apparatus consists, therefore, of two separate portions, namely a hot-air or drying portion and a cold-air or cooling portion. Both the drying and the cooling portions of the apparatus' middle sections B and B' are under indirect thermal action of the air which flows through ducts A and C and A' and C', as well as of the direct thermal action of the air which flows down through the apertures 18 and the pipes 29a, 29b and 29c. The only difference in principle between the hot-air portion and the cold-air portion is that part of the cold air is given a separate drying treatment and then conveyed directly down into middle section B' of the apparatus.

As will be understood, the above description serves solely to make clear the principle of a preferred embodiment of the apparatus, as it is possible to arrange and design the various conduits etc. in various ways. Thus the drying can be performed exclusively with the hot air which is conveyed down to the middle of the dishes, although it is found convenient to heat the dishes also by heating the annular plate in the drying department, for example, to about 110 to 150° C. in the described manner or, for example, by electric current or in some other way.

The mode of operation in using the apparatus is as follows:

Light aluminum dishes of about 6 cm. diameter and 1.7 cm. high are employed, and it is presumed that the dishes will be thrown away after each analytical test. An analytical balance of suitable accuracy and speed is used, such as a Mettler gramatic balance. First the empty dish is weighed and this is noted down. Then about 1 ml. mixed milk sample is put into the dish, and the dish plus milk is weighed as quickly as possible, and the weight noted down. The dish with sample is lifted off the balance with a pair of tongs, and the milk spread evenly over the bottom of the dish by suitable inclinations of the dish. The dish with the sample is placed on the open place 40 in the circular dryer, and approximately every other minute the rotor is moved one place forwards mechanically in a clock-wise direction. When the twelfth dish with the milk sample has been weighed and put into the drying apparatus, the first dish will emerge on the open place 40 with dried milk substance at room temperature. This will at once be weighed and the weight noted down. In an apparatus of the type mentioned it is possible in the course for four hours to determine the solids in more than 100 samples of milk.

The apparatus acts like a double heat exchanger of counter-flow type, the dishes in the first eight sectors being preferably heated in stages to, for example, 125° C. or to the temperature which is found to give results which, for milk, agree best with the official AOAC method and then cooled without absorption of moisture, until the dishes with contents have again reached room temperature.

We claim:

1. An apparatus for the simultaneous drying of a plurality of samples of organic liquids for use in determining the total solids in said liquids, comprising an elongated enclosure having an upper section, a middle part, and a lower section extending along the length thereof, means on said apparatus for dividing the length of said middle part into a plurality of zones, heated medium feed means connected to said enclosure at a zone intermediate of the length of said enclosure for feeding a heated medium into one of the sections of said enclosure and along the length of said enclosure toward one end of said enclosure to form a heating portion of said enclosure, cooled medium feeding means connected to said enclosure at the zone which is at the other end of said enclosure for feeding a cooled medium into said enclosure along the length thereof toward the zone which is next adjacent to said intermediate zone in the direction toward said intermediate zone of said enclosure for forming a cooling portion of said enclosure, a gaseous medium feeding means at each zone in said heating portion of said enclosure and between one of said sections and the middle part of the zone for feeding a gaseous medium substantially at the temperature of the medium at that zone downwardly into said middle part of the zone, a gaseous medium feeding means connected between said cooled medium feeding means and to each of the zones in said cooling portion of said enclosure for feeding gaseous cooled medium to each cooling zone, and an intermittently moveable conveying means extending into said middle part of said enclosure for conveying a plurality of containers with samples of liquid therein successively through the zones of said enclosure from said one end thereof to the other end thereof.

2. An apparatus for the simultaneous drying of a plurality of samples of organic liquids for use in determining the total solids in said liquids, comprising an elongated enclosure having an upper section, a middle section, and a lower section extending along the length thereof, means on said apparatus for dividing the length of said middle section into a plurality of zones, heated medium feed means connected to one section of said upper and lower sections of said enclosure at a zone intermediate of the length of said enclosure for feeding a gaseous heated medium into said enclosure and along the upper and lower sections thereof toward one end of said enclosure to form a heating portion of said enclosure, cooled medium feeding means connected to said enclosure at the zone which is at the other end of said enclosure for feeding a gaseous cooled medium into said enclosure along the upper and lower sections thereof toward the zone which is next adjacent to said intermediate zone in the direction toward the intermediate zone of said enclosure for forming a cooling portion of said enclosure, gaseous medium feeding means between said upper section and said middle section in each zone in said heating portion of said enclosure for feeding the heated gaseous medium in said upper section to said middle section in each zone, a gaseous medium feeding means connected between said cooled medium feeding means and to each of the zones in said cooling portion of said enclosure for feeding gaseous cooling medium to each cooled zone, and an intermittently movable conveying means extending into said middle section of said enclosure for conveying a plurality of containers with samples of liquid therein successively through the zones of said enclosure from said one end thereof to the other end thereof.

3. An apparatus as clamed in claim 2 in which said enclosure is in a straight line.

4. An apparatus as claimed in claim 2 in which said enclosure is in a circle.

5. An apparatus as claimed in claim 4 in which said intermittently moveable conveying means comprises a rotor, said middle section opening inwardly of said enclosure toward said rotor, and said rotor having a ring thereon substantially closing the inward opening from said middle section, and said means for dividing said middle section into a plurality of zones comprises a plurality of walls extending radially outwardly from said ring and substantially filling the cross section of said middle section.

6. An apparatus for the simultaneous drying of a plurality of samples of milk for use in determining the total solids in the milk comprises an elongated annular enclosure extending around a central space, a pair of horizontally positioned walls extending around the circumference of said enclosure and dividing the interior of said enclosure into an upper and a lower section, said enclosure having an annular opening around the inside circumference thereof opening into said central space, a rotor rotatably mounted in said central space and having a ring therearound substantially enclosing said annular opening, a plurality of radially outwardly extending walls on said ring substantially filling the cross section of the middle section of said enclosure and dividing it into twelve zones, the upper portion of said enclosure and the upper said pair of walls in the twelfth zone having an aperture therein opening the upper and middle sections of the enclosure in said twelfth zone to the atmosphere, a gaseous medium pump means, a partition in the upper and lower section of said enclosure between the eighth and ninth zones, a gaseous medium heater and gaseous medium cooler to which said pump means is connected for pumping a gaseous medium to said heater and cooler, duct means in said enclosure connecting said gaseous medium heater to the lower section in said eighth zone and connecting the gaseous medium cooler to the lower section of said twelfth zone, further duct means in said enclosure connecting said lower and upper section of said enclosure, said enclosure having gaseous medium outlets therefrom at the first and ninth zones, said upper of said pair of walls having a valved aperture therein at the center of each of the first to the eighth zones, a dryer, conduit means from said gaseous medium cooler to said dryer and from said dryer to each said ninth to eleventh zones of the middle sections, and rod members on said radially outwardly extending walls for pushing dishes along the lower of said pair of walls as said rotor rotates.

7. In a method of determining the total solids in organic liquid materials, especially milk products, in which the product is first weighed in a container of known weight, and after drying, the dried product and container are again weighed, that improvement in the step of drying the product comprising using an open topped container, substantially preventing access of outside air to said container, directing a successive series of streams of hot gas downwardly against the center of and then outwardly along the surface of the liquid material in the container, each succeeding stream of hot gas being hotter than the streams preceding it, and then cooling the container and the dried material in it, whereby the thus heated and then cooled sample can be weighed.

8. In a method of determining the total solids in organic liquid materials, especially milk products, in which the product is first weighed in a container of known weight, and after drying, the dried product and container are again weighed, that improvement in the step of drying the product comprising using an open topped container, substantially preventing access of outside air to said container, directing a successive series of streams of hot gas downwardly against the center of and then outwardly along the surface of the liquid material in the container, each succeeding stream of hot gas being hotter than the streams preceding it, and directing a successive series of streams of cold gas downwardly against the center of and then outwardly along the surface of the material in the container, each succeeding stream of cold gas being less cold than the streams preceding it in order to cool the container and the dried material in it, whereby the thus heated and then cooled sample can be weighed.

9. In a method of determining the total solids in organic liquid materials, especially milk products, in which the product is first weighed in a container of known weight, and after drying, the dried product and container are again weighed, that improvement in the step of drying the product comprising placing samples to be dried and weighed in a plurality of open topped containers, and after weighing them, substantially preventing access of outside air to said containers, directing a series of streams of hot gas downwardly against the center of and then outwardly along the surface of the liquid material in the containers, the respective streams of the series being directed against the material in the respective containers, then directing the respective streams of the series against the next succeeding containers in the plurality respectively, each succeeding stream of hot gas in the series of streams being hotter than the streams preceding it, repeating the step of directing the streams of hot gas against the respective succeeding containers, and cooling the containers and the dried material in them after the hottest of the streams of hot gases has been directed against them.

10. An apparatus for the simultaneous drying of a plurality of samples of organic liquids for use in determining the total solids in said liquids, comprising an elongated enclosure having an upper section, a middle part, and a lower section extending along the length thereof, means on said apparatus for dividing the length of said middle part into a plurality of zones, heated medium feed means connected to said enclosure at a zone intermediate of the length of said enclosure for feeding a heated medium into said enclosure and along the length of said enclosure toward one end of said enclosure to form a heating portion of said enclosure, cooled medium feeding means connected to said enclosure at the zone which is at the other end of said enclosure for feeding a cooled medium into said enclosure along the length thereof toward the zone which is next adjacent to said intermediate zone in the direction toward said intermediate zone of said enclosure for forming a cooling portion of said enclosure, a gaseous medium feeding means at each zone in said heating portion of said enclosure and between one of said sections and the middle part of the zone for feeding a gaseous medium substantially at the temperature of the medium at that zone downwardly into said middle part of the zone, and an intermittently moveable conveying means extending into said middle part of said enclosure for conveying a plurality of containers with samples of liquid therein successively through the zones of said enclosure from said one end thereof to the other end thereof.

References Cited in the file of this patent

UNITED STATES PATENTS

| | | |
|---|---|---|
| 1,651,764 | Gibbons et al. | Dec. 6, 1927 |
| 2,047,765 | Brabender | July 14, 1936 |
| 2,709,914 | Brabender et al. | June 7, 1955 |